(No Model.)
J. CROMWELL.
MODE OF RIPENING BANANAS.
No. 246,664. Patented Sept. 6, 1881.
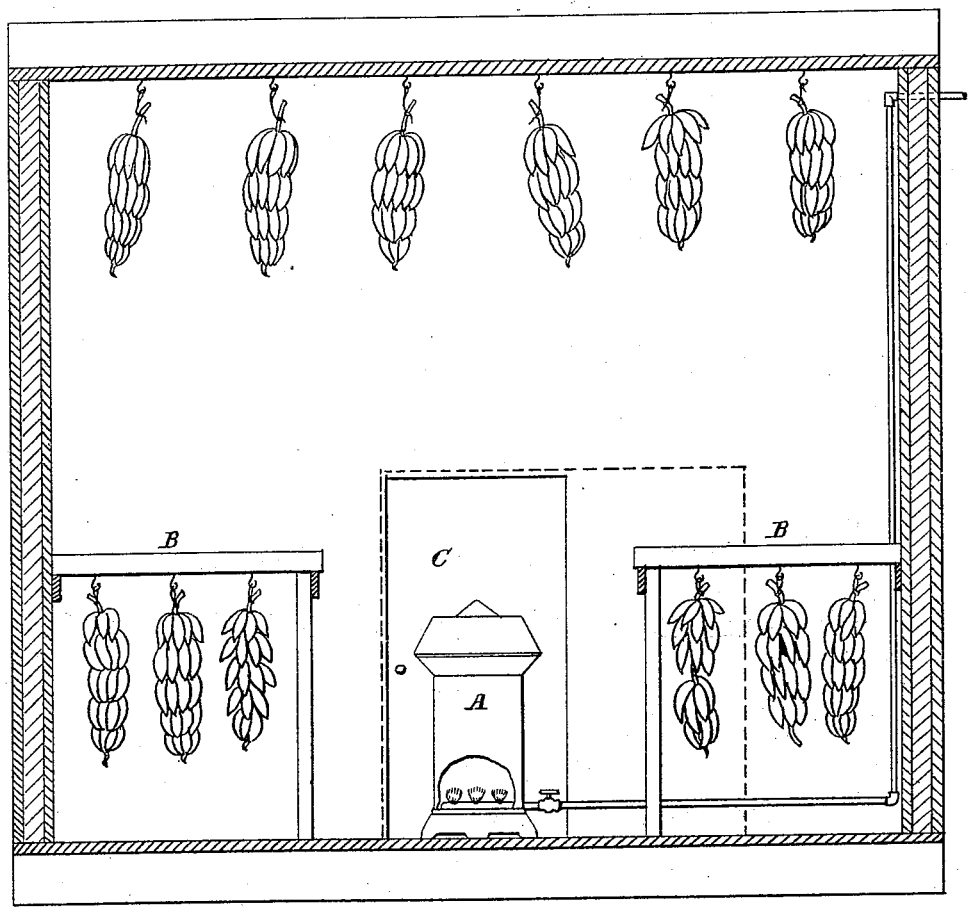
ATTEST:
R. Connett.
E. B. Bolton
INVENTOR:
Joshua Cromwell
by his Atty's
Burke, Fraser & Connett.
N. PETERS, Photo-Lithographer, Washington, D. C.

UNITED STATES PATENT OFFICE.

JOSHUA CROMWELL, OF GREEN POINT, ASSIGNOR OF TWO-THIRDS TO HENRY E. WESSELS, OF BROOKLYN, AND WM. M. HINTON, OF NEW YORK, N. Y.

MODE OF RIPENING BANANAS.

SPECIFICATION forming part of Letters Patent No. 246,664, dated September 6, 1881.

Application filed February 14, 1881. (No model.)

*To all whom it may concern:*

Be it known that I, JOSHUA CROMWELL, a citizen of the United States, residing at Green Point, in the county of Kings and State of New York, have invented an Improved Mode of Ripening Bananas, &c., of which the following is a specification.

The banana, being a tropical fruit, is gathered while yet green or unripe for shipment to the northern markets. If allowed to ripen on the stalk, they will decay in transit, and, being very delicate and sensitive to changes in temperature, they cannot be ripened in cold weather, except by artificial means. Heretofore, so far as I am aware, they have only been ripened successfully during the warm months of the year, in localities where the temperature averages as low as 50° Fahrenheit during the winter, as the cold and sudden changes of temperature are fatal to success in ripening them.

My object is to take the bunches of unripe bananas as they are shipped from the localities where they are grown, and to ripen them evenly and fit them for market at all times of the year without regard to the normal temperature of the locality where they are ripened. To this end I provide a room, preferably about fourteen feet square and about ten feet from floor to ceiling, and inclose it perfectly tight with some suitable non-conducting material. A double wall of tongued and grooved boards filled in with sawdust will serve the purpose. This room I fit with a sliding door as a means of access, and hooks in the ceiling from which to suspend the bunches of bananas. To economize space I also provide suitable racks or poles raised about forty inches above the floor, from which the bunches are also suspended, care being taken that none touch the floor. An ordinary gas-pipe is led into the room from the main and carried to about the middle of the room, and to this is connected a gas-stove; or a flexible tube may be used to convey the gas from the wall or ceiling to the stove. I employ, by preference, an ordinary gas-stove, consisting of a sheet-metal drum or cylinder provided with four or more burners. With this stove the air of the room is maintained at an even temperature of from 65° to 68° Fahrenheit, being careful not to exceed 70°, for from forty-eight to ninety-six hours, or until the bananas are properly "colored" or ripened. This mode of heating by combustion in the room produces some moisture, and some also exudes from the bananas and their stems in ripening, and as an excess of moisture will inevitably destroy the fruit, I sprinkle the floor thickly with an absorbent material—such as sawdust, for example. This absorbent material I generally remove and replace about once in every twenty-four hours. During the process of ripening, thermometers should be kept in different parts of the room, to test the temperature, which may be readily regulated by means of gas-cocks, and as the heat will always be greater near the ceiling, the bunches of fruit should be shifted from the racks to the ceiling-hooks, and vice versa, quite frequently. This, however, will depend upon the judgment and experience of the operator, as some of the bunches ripen more readily than others. When the fruit has been properly colored the temperature may be gradually diminished to 55°, and maintained at that as the proper temperature to preserve the ripened fruit in good condition until sold.

The several varieties of banana may be ripened in this manner, no change being required in the treatment of the different kinds. Care should be taken in all cases, however, to avoid drafts of cold air, to keep the air as dry as possible, and to preserve an even temperature, as stated.

Oranges and lemons have been ripened by steaming them in close rooms at higher temperatures than I have given herein; but such treatment would inevitably destroy bananas.

In the accompanying drawing, which is a sectional elevation, I have shown the interior of a room adapted to carrying out my process. In this view, A represents an ordinary gas-stove, B B the racks before mentioned, and C the sliding door for ingress and egress.

Ripe bananas have heretofore been desiccated by heat for preserving them. To accomplish this, however, the banana must first be ripened, and I am not aware that desiccation has been employed outside of those regions wherein bananas are grown, and where they ripen on the stalk. This desiccating process is entirely distinct from ripening. My process ripens the banana, but does not dry it. Indeed, the unripe banana is, to all appearances, drier than it is after ripening.

My process occupies a middle ground between the steaming process employed in ripening the hardier fruits, as lemons and oranges, and the desiccating process employed for drying ripe bananas for preservation, and I do not claim either of these.

Having thus described my invention, I claim—

The herein-described method of treating unripe bananas, which consists in suspending them in a close room in the presence of an absorbent material, and then subjecting them to heat maintained at from 65° to 70° Fahrenheit until properly ripened or colored, substantially as set forth.

In witness whereof I have hereunto signed my name in the presence of two subscribing witnesses.

JOSHUA CROMWELL.

Witnesses:
HENRY CONNETT,
HENRY E. WESSELS.